(12) United States Patent
Lee et al.

(10) Patent No.: US 7,079,213 B2
(45) Date of Patent: Jul. 18, 2006

(54) ARRAY SUBSTRATE FOR IN-PLANE SWITCHING MODE LIQUID CRYSTAL DISPLAY AND METHOD OF FABRICATING SAME

(75) Inventors: Seung-Chul Lee, Gyeonggi-do (KR); Ki-Bok Park, Gyeongsungbuk-do (KR); Won-Ho Lee, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 100 days.

(21) Appl. No.: 10/862,531

(22) Filed: Jun. 8, 2004

(65) Prior Publication Data

US 2004/0252268 A1 Dec. 16, 2004

(30) Foreign Application Priority Data

Jun. 12, 2003 (KR) .................. 10-2003-0037910

(51) Int. Cl.
*G02F 1/1343* (2006.01)
(52) U.S. Cl. ...................... 349/141; 349/143
(58) Field of Classification Search ............... 349/141, 349/143
See application file for complete search history.

(56) References Cited

U.S. PATENT DOCUMENTS

| | | | | |
|---|---|---|---|---|
| 5,598,285 A | * | 1/1997 | Kondo et al. ............... 349/39 |
| 5,745,207 A | * | 4/1998 | Asada et al. .............. 349/141 |
| 5,946,066 A | * | 8/1999 | Lee et al. ................ 349/141 |
| 5,946,067 A | * | 8/1999 | Kim et al. ............... 349/141 |
| 5,977,562 A | * | 11/1999 | Hirakata et al. ............ 257/72 |
| 6,040,887 A | * | 3/2000 | Matsuyama et al. ........ 349/141 |
| 6,088,078 A | * | 7/2000 | Kim et al. ............... 349/141 |
| 6,091,473 A | * | 7/2000 | Hebiguchi ............... 349/141 |
| 6,128,061 A | * | 10/2000 | Lee et al. ................ 349/141 |
| 6,762,815 B1 | * | 7/2004 | Lee ..................... 349/141 |

* cited by examiner

*Primary Examiner*—Tarifur R. Chowdhury
(74) *Attorney, Agent, or Firm*—Morgan, Lewis & Bockius, LLP

(57) ABSTRACT

An array substrate is provided for an in-plane switching mode liquid crystal display device. The array substrate includes a substrate, a thin film transistor on the substrate, a gate line connected to the transistor, a data line crossing the gate line and connected to the transistor such that the crossed data line and gate line define boundaries of a pixel region, a pixel electrode disposed in the pixel region connected to the transistor, and a common electrode disposed in the pixel region. The pixel electrode has at least one vertical portion and a plurality of horizontal portions, and the common electrode has at least two horizontal portions and a plurality of horizontal portions. The vertical portion of the pixel electrode is between the vertical portions of the common electrode, and the horizontal portions of the common electrode cross the vertical portion of the pixel electrode.

19 Claims, 18 Drawing Sheets

ARRAY SUBSTRATE FOR IN-PLANE SWITCHING MODE LIQUID CRYSTAL DISPLAY AND METHOD OF FABRICATING SAME

The present invention claims the benefit of Korean Patent Application No. 2003-37910, filed in Korea on Jun. 12, 2003, which is hereby incorporated by reference.

BACKGROUND OF THE INVENTION

1. Field of the Invention

The present invention relates to a liquid crystal display device, and more particularly, to an in-plane switching mode liquid crystal display device having high aperture ratio, wide viewing angle and high brightness.

2. Discussion of the Related Art

A liquid crystal display device uses the optical anisotropy and polarization properties of liquid crystal molecules to produce an image. The long thin shapes of the liquid crystal molecules can be aligned to have an orientation in a specific direction. The alignment direction of the liquid crystal molecules can be controlled by an applied electric field. In other words, as an applied electric field changes, the alignment of the liquid crystal molecules also changes. Due to the optical anisotropy of the liquid crystal molecules, the refraction of incident light depends on the alignment direction of the liquid crystal molecules. Thus, by properly controlling an electric field applied to a group of liquid crystal molecules in respective pixels, a desired image can be produced by diffracting light.

There are many types liquid crystal displays (LCDs). One type of LCD is an active matrix LCD (AM-LCD) that has a matrix of pixels. Each of the pixels in an AM-LCD has a thin film transistor (TFT) and pixel electrode. AM-LCDs are the subject of significant research and development because of their high resolution and superiority in displaying moving images.

A related art LCD includes a color filter substrate (upper substrate) having a common electrode, an array substrate (lower substrate) having a pixel electrode, and a liquid crystal layer interposed between the color filter substrate and the array substrate. In the related art LCD, the liquid crystal layer is driven by a vertical electric field between the pixel electrode and the common electrode. Accordingly, the related art LCD has increased transmittance and aperture ratio. The related art LCD, however, has a narrow viewing angle because it is driven by the vertical electric field. To solve the above problems, various types of LCDs having a wide viewing angle such as an in-plane switching (IPS) mode LCD device have been suggested.

FIG. 1 is a schematic cross-sectional view of an in-plane mode liquid crystal display device according to the related art. In FIG. 1, an in-plane switching (IPS) mode liquid crystal display (LCD) device includes first and second substrates 50 and 30 facing and spaced apart from each other, and a liquid crystal layer 90 interposed therebetween. The first substrate 50 has a plurality of pixel regions "P1" and "P2." A thin film transistor (TFT) "T," a common electrode 58 and a pixel electrode 72 are formed on the first substrate 50 in each pixel region "P1" and "P2." The TFT "T" includes a gate electrode 52, a semiconductor layer 62 over the gate electrode 52, a source electrode 64 and a drain electrode 66 spaced apart from the source electrode 64. A gate insulating layer 60 is interposed between the gate electrode 52 and the semiconductor layer 62. The common electrode 58 and the pixel electrode 72 are parallel to and spaced apart from each other.

The common electrode 58 may be formed of the same material and the same layer as the gate electrode 52, and the pixel electrode 72 may be formed of the same material and the same layer as the source and drain electrodes 64 and 66. In addition, the pixel electrode 72 may be formed of a transparent material to increase aperture ratio. Even though not shown in FIG. 1, a gate line, a data line crossing the gate line and a common line supplying a common voltage to the common electrode 58 may be formed on the first substrate 50.

A black matrix 32 corresponding to the gate line, the data line and the TFT "T" is formed on the second substrate 50. A color filter layer 34 including sub-color filters 34a and 34b is formed on the black matrix 32. Each sub-color filter 34a and 34b corresponds to the pixel region "P1" and "P2." A liquid crystal layer 90 is driven by a lateral electric field 95 between the common electrode 58 and the pixel electrode 72.

FIG. 2 is a schematic plan view of an array substrate for an in-plane switching mode liquid crystal display device according to the related art. In FIG. 2, a gate line 54 is formed on a substrate 50 and a data line 68 crosses the gate line 54 to define a pixel region "P." In addition, a common line 56 parallel to the gate line 54 crosses the pixel region "P." A thin film transistor (TFT) "T" including a gate electrode 52, a semiconductor layer 62, a source electrode 64 and a drain electrode 66 is connected to the gate line 54 and the data line 68. The gate electrode 52 and the source electrode 64 are connected to the gate line and the data line 68, respectively. Common electrodes 58 are formed in the pixel region "P." The common electrodes 58 perpendicularly extend from the common line 56 and are parallel to each other. Pixel electrodes 72 alternate with and are parallel to the common electrodes 58.

FIG. 3A is a schematic view showing an OFF state of a liquid crystal layer of an in-plane switching mode liquid crystal display device according to the related art and FIG. 3B is a schematic view showing an ON state of liquid crystal molecules of an in-plane switching mode liquid crystal display device according to the related art.

In FIG. 3A, a liquid crystal molecule 90a keeps an initial state when a voltage is not applied to a common electrode 58 and a pixel electrode 72. As shown in FIG. 3B, when a voltage is applied to the common electrode 58 and the pixel electrode 72, a lateral electric field 95 is generated between the common electrode 58 and the pixel electrode 72. The liquid crystal molecule 90a rotates according to the lateral electric field 95 and is re-arranged to have an angle with respect to the lateral electric field 95. When the liquid crystal molecule 90a makes an angle of 45° with respect to the lateral electric field 95, transmittance of the liquid crystal layer is maximized. However, if a higher voltage is applied, the liquid crystal molecule 90a rotates and makes an angle less than 45° with respect to the lateral electric field 95. As a result, transmittance is reduced again.

FIG. 4 is a V-T curve showing transmittance property according to voltage of an in-plane switching mode liquid crystal display device according to the related art. As shown in FIG. 4, assuming that a maximum applied voltage is 10V, transmittance has the maximum value at 6V. As the applied voltage increases over 6V, a transmittance curve declines. When a voltage over 6V is applied, a liquid crystal molecule is re-arranged nearly parallel to a lateral electric field.

Accordingly, the liquid crystal molecule makes an angle less than 45° with respect to the lateral electric field and transmittance is reduced.

FIG. 5 is a graph showing a viewing angle property of an in-plane switching mode liquid crystal display device according to the related art. As shown in FIG. 5, viewing angle property is not symmetrical according to viewpoint such as up-and-down and right-and-left of a liquid crystal panel. Accordingly, a stable wide viewing angle is not obtained and a color shift, such as yellow shift and blue shift, severely occurs. These disadvantages deteriorate display quality of an IPS mode LCD device.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide an in-plane switching mode liquid crystal display device having stable transmittance property with high applied voltage and a method of fabricating the same.

Another object of the present invention is to provide an in-plane switching mode liquid crystal display device where a common electrode and a pixel electrode of "L" shape symmetrically face each other and a method of fabricating the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching mode liquid crystal display device comprises a substrate; a thin film transistor on the substrate; a gate line connected to the transistor; a data line crossing the gate line and connected to the transistor, the crossed data line and gate line defining boundaries of a pixel region; a pixel electrode disposed in the pixel region connected to the transistor, the pixel electrode including at least one vertical portion and a plurality of horizontal portions; and a common electrode disposed in the pixel region, the common electrode including at least two horizontal portions and a plurality of horizontal portions, wherein the vertical portion of the pixel electrode is disposed between the vertical portions of the common electrode, and the horizontal portions of the common electrode cross the vertical portion of the pixel electrode.

In another aspect, a method of fabricating an array substrate for an in-plane switching mode liquid crystal display device comprises forming a gate line on a substrate; forming a data line crossing the gate line, the crossed data line and gate line defining boundaries of a pixel region; forming a thin film transistor; forming a pixel electrode in the pixel region to include a vertical portion and a plurality of horizontal portions; and forming a common electrode in the pixel region to include at least two vertical portions and a plurality of horizontal portions, wherein the pixel electrode, data line and gate electrode are connected to the thin film transistor, wherein the vertical portion of the pixel electrode is disposed between the vertical portions of the common electrode, and wherein the horizontal portions of the common electrode cross the vertical portion of the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 1:
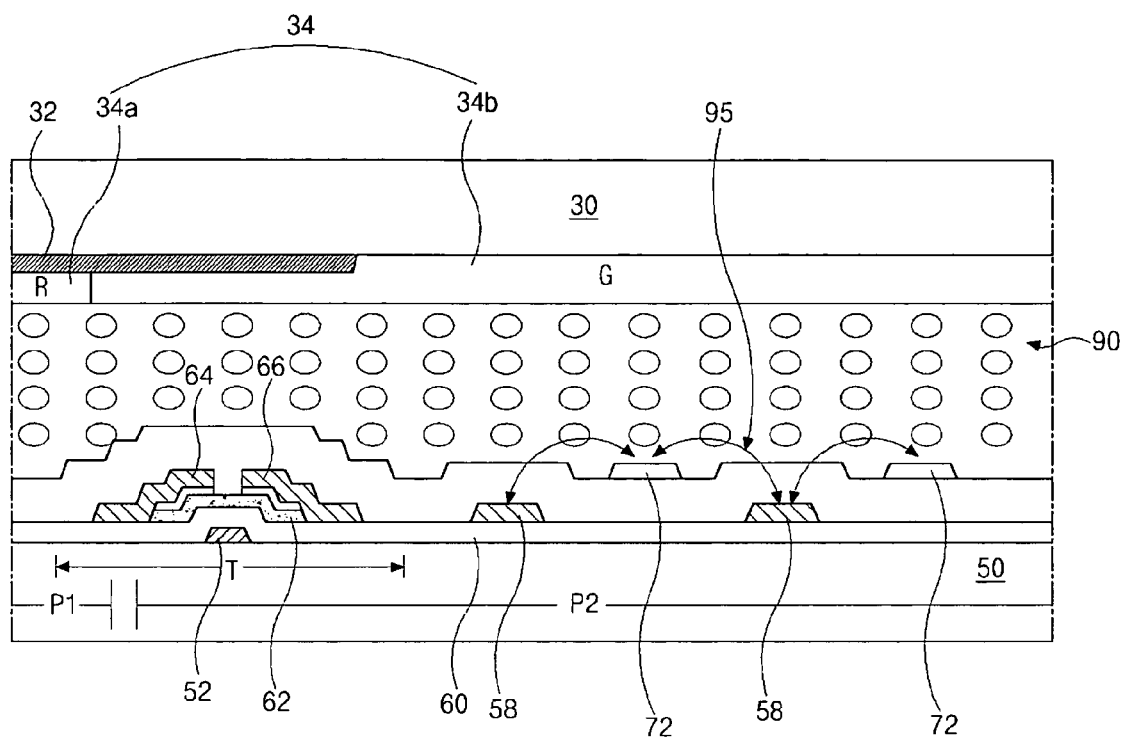
FIG. 1 is a schematic cross-sectional view of an in-plane mode liquid crystal display device according to the related art.
Figure 2:
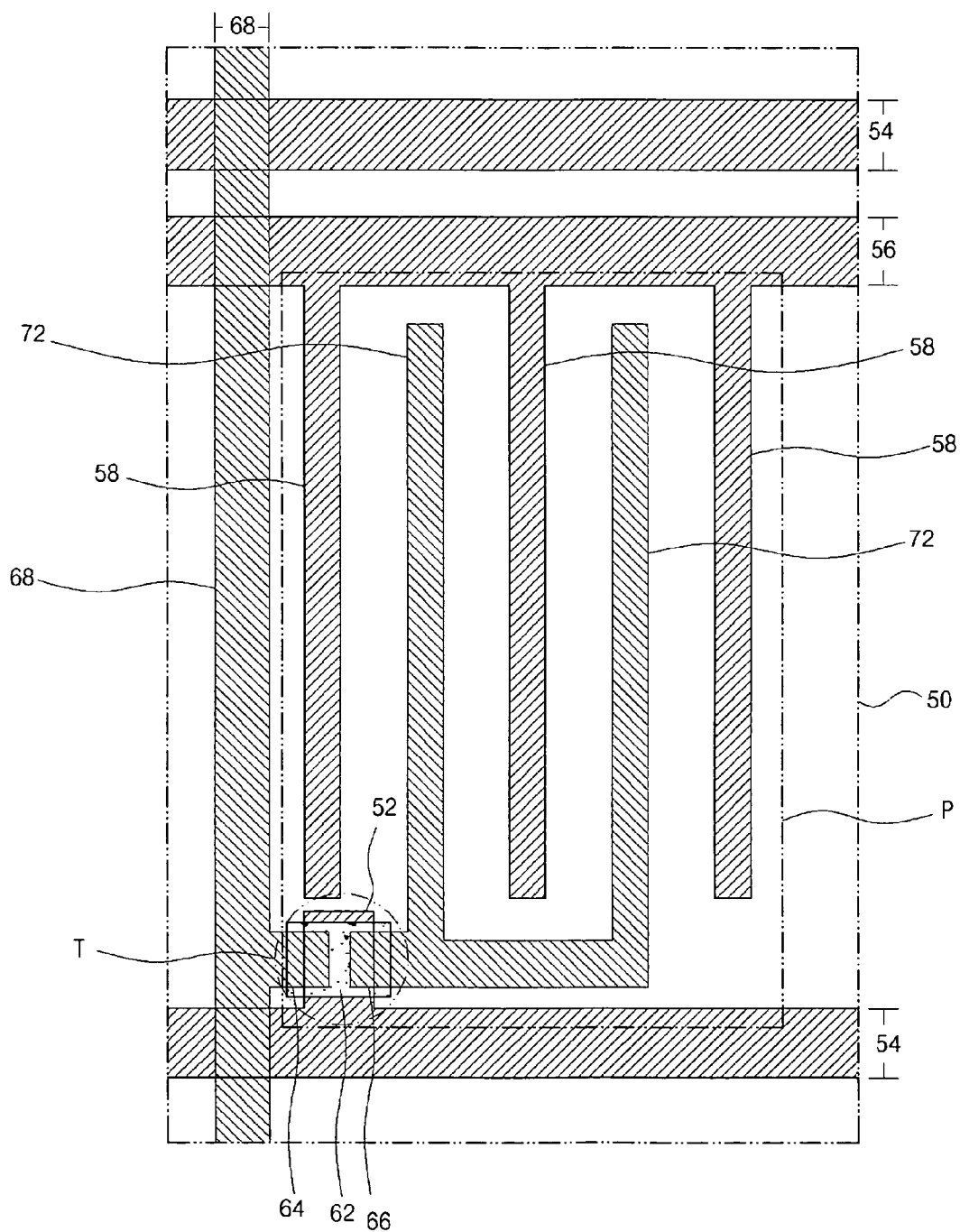
FIG. 2 is a schematic plan view of an array substrate for an in-plane switching mode liquid crystal display device according to the related art.
Figure 3A:
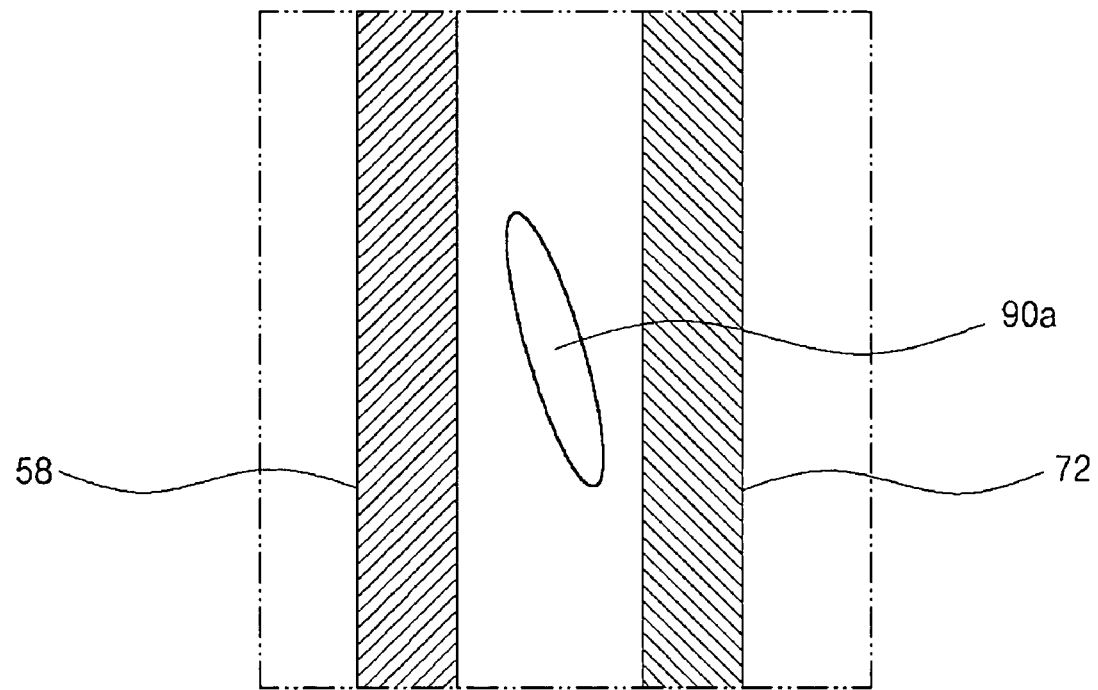
FIG. 3A is a schematic view showing an OFF state of a liquid crystal layer of an in-plane switching mode liquid crystal display device according to the related art.
Figure 3B:
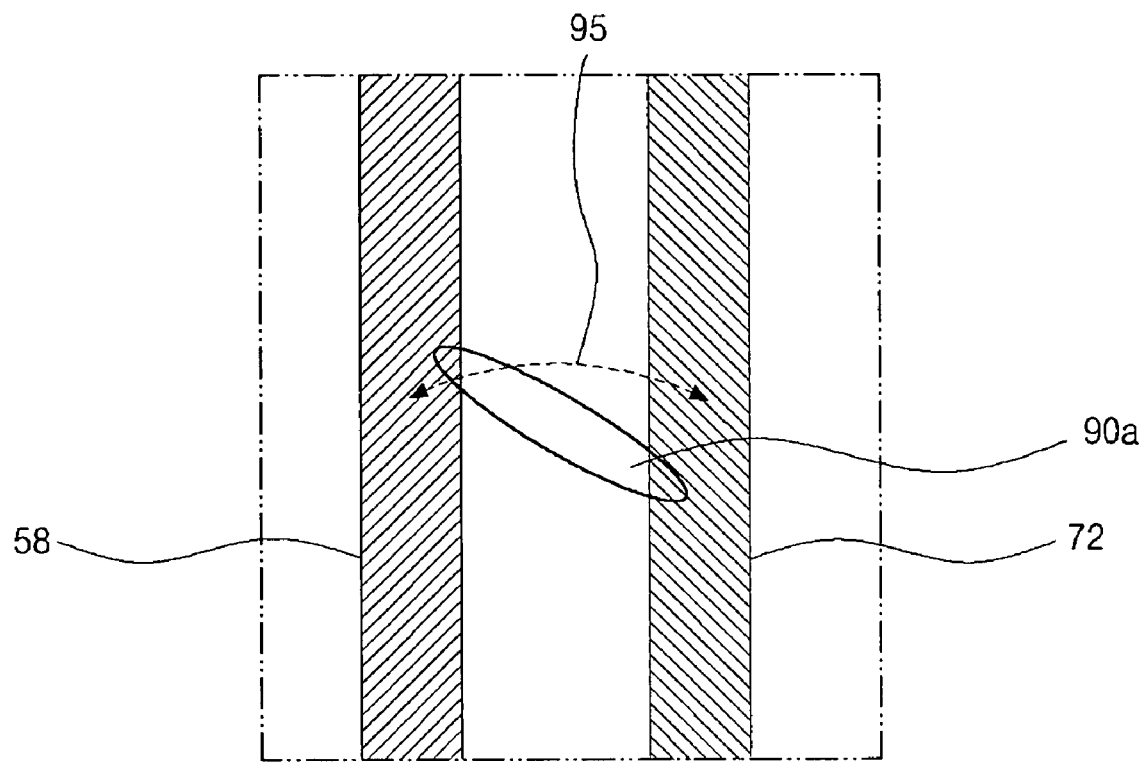
FIG. 3B is a schematic view showing an ON state of liquid crystal molecules of an in-plane switching mode liquid crystal display device according to the related art.
Figure 4:
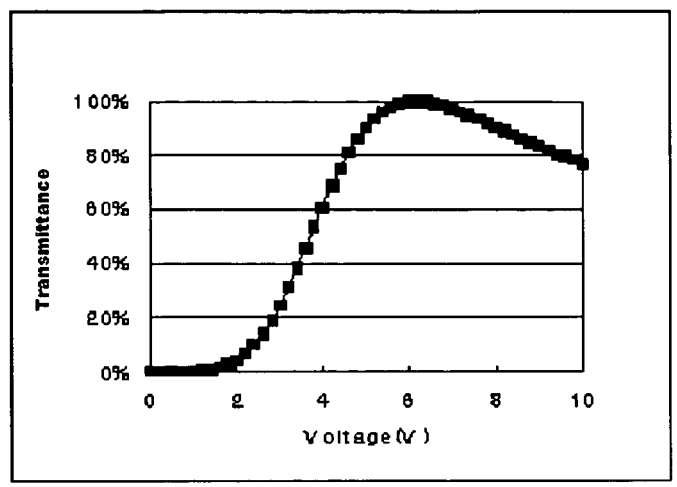
FIG. 4 is a V-T curve showing transmittance property according to voltage of an in-plane switching mode liquid crystal display device according to the related art.
Figure 5:
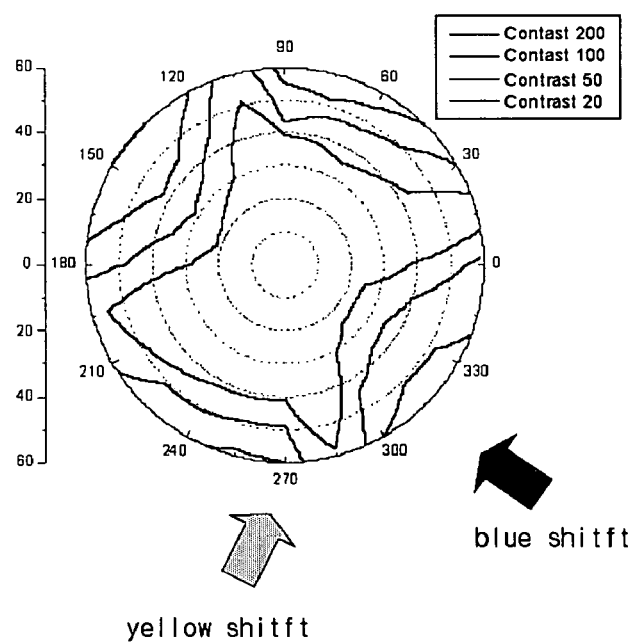
FIG. 5 is a graph showing a viewing angle property of an in-plane switching mode liquid crystal display device according to the related art.
Figure 6:
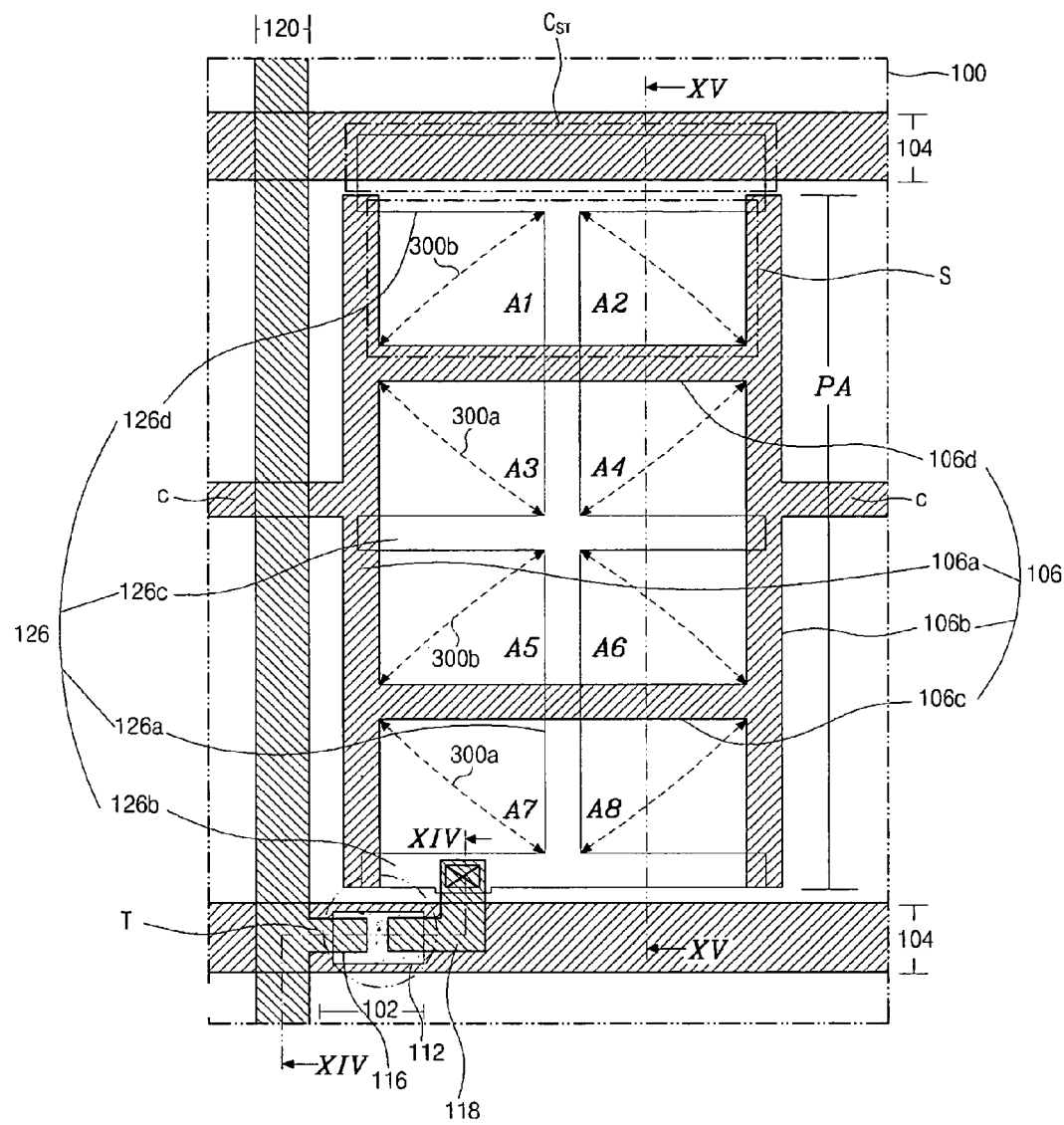
FIG. 6 is a schematic plan view of an array substrate for an in-plane switching mode liquid crystal display device according to a first embodiment of the present invention.

FIG. 6 is a schematic plan view of an array substrate for an in-plane switching mode liquid crystal display device according to a first embodiment of the present invention. In FIG. 6, a gate line 104 is disposed along a first direction on a substrate 100 and a data line 120 is disposed along a second direction. The data line 120 crosses the gate line 104 to define a pixel region "PA." A thin film transistor (TFT) "T" including a gate electrode 102, a semiconductor layer 112, a source electrode 116 and a drain electrode 118 is formed in the pixel region "PA." A common electrode 106 alternates with a pixel electrode 126 along the first and second directions in the pixel region "PA." The common electrode 106 and the pixel electrode 126 having a shape of character "L" symmetrically face each other along a diagonal direction of the pixel region "PA." Accordingly, the pixel region "PA" may be divided into a plurality of domains "A1" to "A8" each having a rectangular shape.

The common electrode 106 includes a first vertical portion 106a, a second vertical portion 106b, a first horizontal portion 106c and a second horizontal portion 106d. The first and second vertical portions 106a and 106b are disposed at both sides of the pixel region "PA" and parallel to the data line 120, and the first and second horizontal portions 106c and 106d cross and combine the first and second vertical portions 106a and 106b. The pixel electrode 126 includes a vertical portion 126a, a first horizontal portion 126b, a second horizontal portion 126c and a third horizontal portion 126d. The vertical portion 126a is parallel to and spaced apart from the first and second vertical portions 106a and 106b of the common electrode 106, and the first to third horizontal portions 126b to 126d cross the vertical portion 126a. The first and second horizontal portions 106c and 106d of the common electrode 106 alternate with and are spaced apart from the first to third horizontal portions 126b to 126d of the pixel electrode 126.

A common line "c" connects the common electrode 106 and a neighboring common electrode (not shown) for supplying a common voltage to all common electrodes in a liquid crystal panel. The third horizontal portion 126d of the pixel electrode 126 overlaps the gate line 104 to define a storage capacitor "$C_{ST}$."

The common electrode 106 and the pixel electrode 126 divide the pixel region "PA" into a plurality of domains "A1" to "A8." Electric fields 300a and 300b generated between the common electrode 106 and the pixel electrode 126 in each domain may have symmetric directions having angles of about 135° and about 45° with respect to the horizontal portions 106c, 106d, 126b, 126c and 126d of the common electrode 106 and the pixel electrode 126. Accordingly, a plurality of domains "A1" to "A8" having symmetric alignment directions are formed in one pixel region "PA" due to the symmetric electric fields 300a and 300b. Moreover, deterioration, such as color shift, is prevented due to an optical compensation and an LCD device having high display quality and wide viewing angle is obtained. In addition, since the electric fields 300a and 300b have diagonal directions, the LCD device has high transmittance even when a relatively high voltage is applied to the common electrode 106 and the pixel electrode 126.

In FIG. 6, the pixel region "PA" is divided into 8 domains. While not shown in figures, the number of domains may be adjusted according to the number of vertical and horizontal portions of the common electrode and the pixel electrode in alternative embodiments.

Figure 7A:
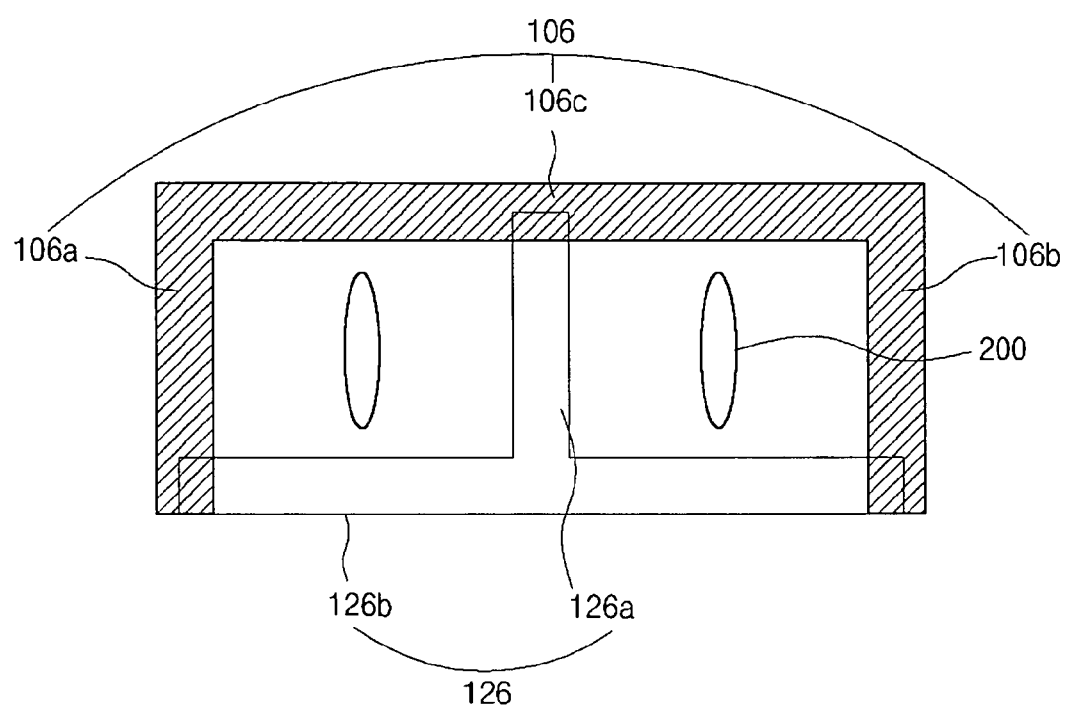
FIG. 7A is a schematic plan view showing an OFF state of a liquid crystal layer of an in-plane switching mode liquid crystal display device according to the first embodiment of FIG. 6.
Figure 7B:
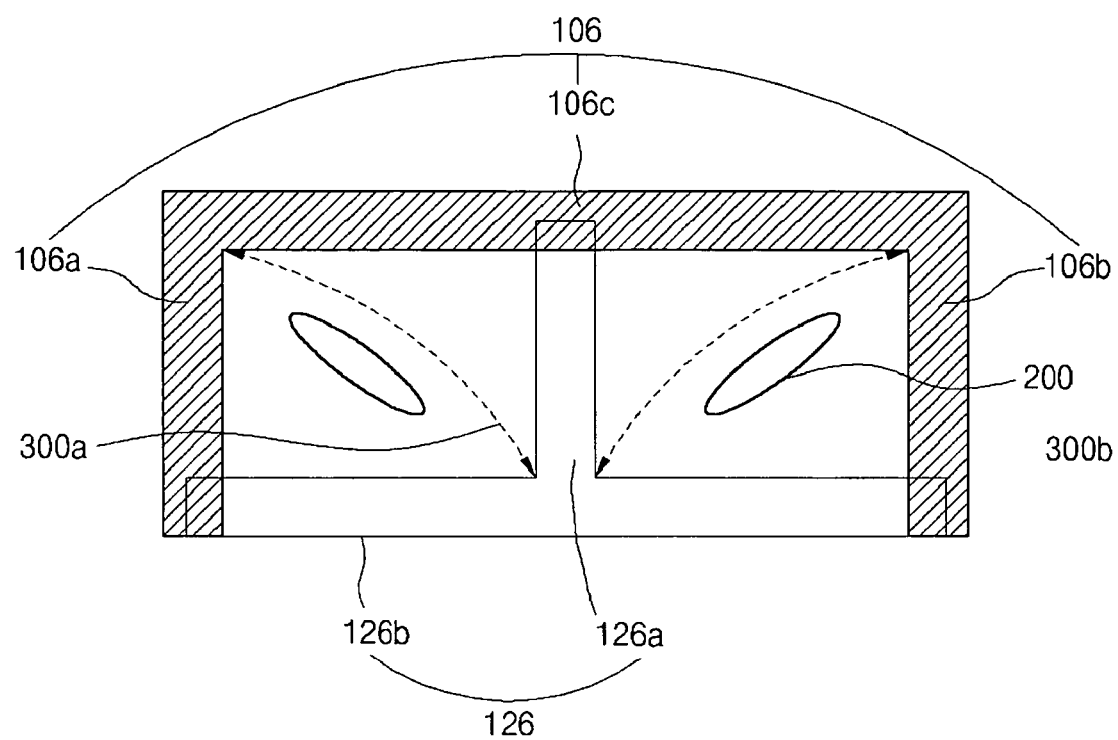
FIG. 7B is a schematic plan view showing an ON state of liquid crystal molecules of an in-plane switching mode liquid crystal display device according to the first embodiment of FIG. 6.

FIG. 7A is a schematic plan view showing an OFF state of a liquid crystal layer of an in-plane switching mode liquid crystal display device, and FIG. 7B is a schematic plan view showing an ON state of liquid crystal molecules of an in-plane switching mode liquid crystal display device.

In FIG. 7A, a common electrode 106 and a pixel electrode 126 having an "L" shape face each other and are symmetrically disposed along a diagonal direction of a pixel region. The common electrode 106 has first and second vertical portions 106a and 106b and a first horizontal portion 106c. The pixel electrode 126 has a vertical portion 126a and a first horizontal portion 126b. Liquid crystal molecules 200 keep an initial state when a voltage is not applied to the common electrode 106 and the pixel electrode 126.

In FIG. 7B, when a voltage is applied to the common electrode 106 and the pixel electrode 126, first and second electric fields 300a and 300b are generated between the common electrode 106 and the pixel electrode 126 and liquid crystal molecules 200 are re-arranged along the first and second electric fields 300a and 300b. As an applied voltage increases, the liquid crystal molecules 200 rotate further such that a long axis of a liquid crystal molecule coincides with a direction of the generated electric field. However, the first electric field 300a makes an angle of about 135° with respect to the first horizontal portion 126b of the pixel electrode 126, and the second electric field 300b makes an angle of about 45° with respect to the first horizontal portion 126b of the pixel electrode 126. Accordingly, the liquid crystal molecules 200 are re-arranged to have angles of about 135° and about 45° with respect to the first horizontal portion 126b of the pixel electrode 126 even when a higher voltage is applied. As a result, transmittance is not reduced when the higher voltage is applied and keeps the maximum value.

Figure 8:
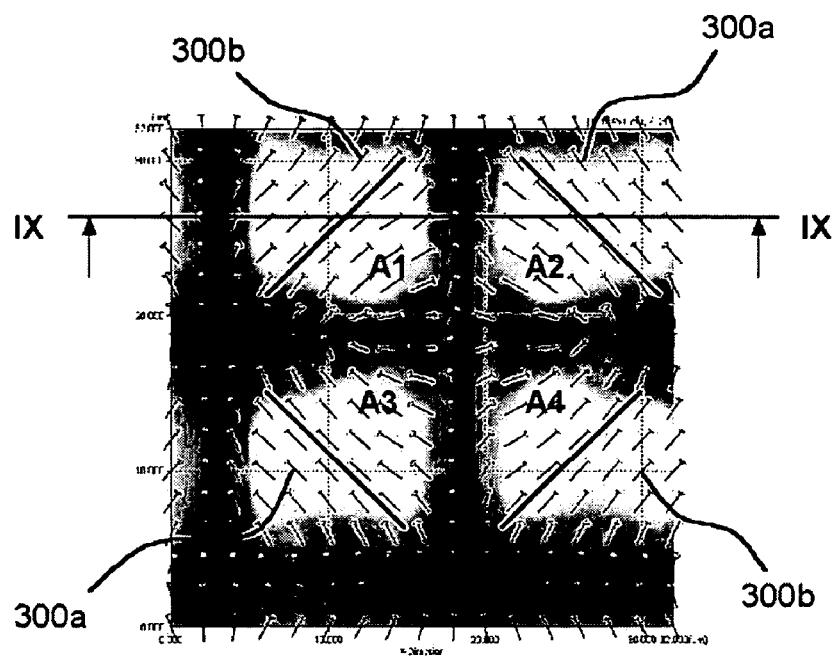
FIG. 8 is a schematic plan view showing an alignment state of liquid crystal molecules of an in-plane switching mode liquid crystal display device according to the first embodiment of FIG. 6.
Figure 9:
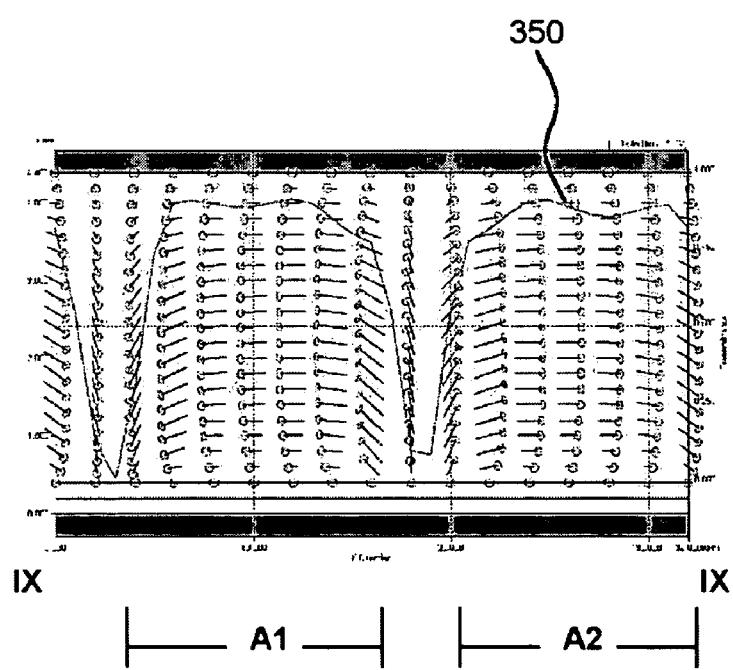
FIG. 9 is a schematic cross-sectional view showing an alignment state of liquid crystal molecules and transmittance of an in-plane switching mode liquid crystal display device according to a first embodiment of the present invention.

FIG. 8 is a schematic plan view showing an alignment state of liquid crystal molecules of an in-plane switching mode liquid crystal display device, and FIG. 9 is a schematic cross-sectional view showing an alignment state of liquid crystal molecules and transmittance of an in-plane switching mode liquid crystal display device. FIG. 8 is taken from a portion "S" of FIG. 6 and FIG. 9 is taken along line "IX—IX" of FIG. 8. FIGS. 8 and 9 are obtained by computer simulation.

As shown in FIG. 8, when a voltage is applied, a pixel region may be divided into first to fourth domains "A1" to "A4" by first and second electric fields 300a and 300b. The first electric field 300a induced in the second and third domains "A2" and "A3" has an angle of about 135° with respect to a first horizontal portion 126a (of FIG. 7B) of the pixel electrode 126 (of FIG. 7B), while the second electric field 300b induced in the first and fourth domains "A1" and "A4" has an angle of about 45° with respect to a first horizontal portion 126a (of FIG. 7B) of the pixel electrode 126 (of FIG. 7B). Accordingly, liquid crystal molecules 200 (of FIG. 7B) are symmetrically re-arranged in the first to fourth domains "A1" to "A4," thereby preventing a color shift due to optical compensation.

As shown in FIG. 9, when a voltage is applied, transmittance curve 350 has maximum value in the first and second domains "A1" and "A2" except for portions corresponding to the common electrode 106 (of FIG. 7B) and the pixel electrode 126 (of FIG. 7B).

Figure 10:
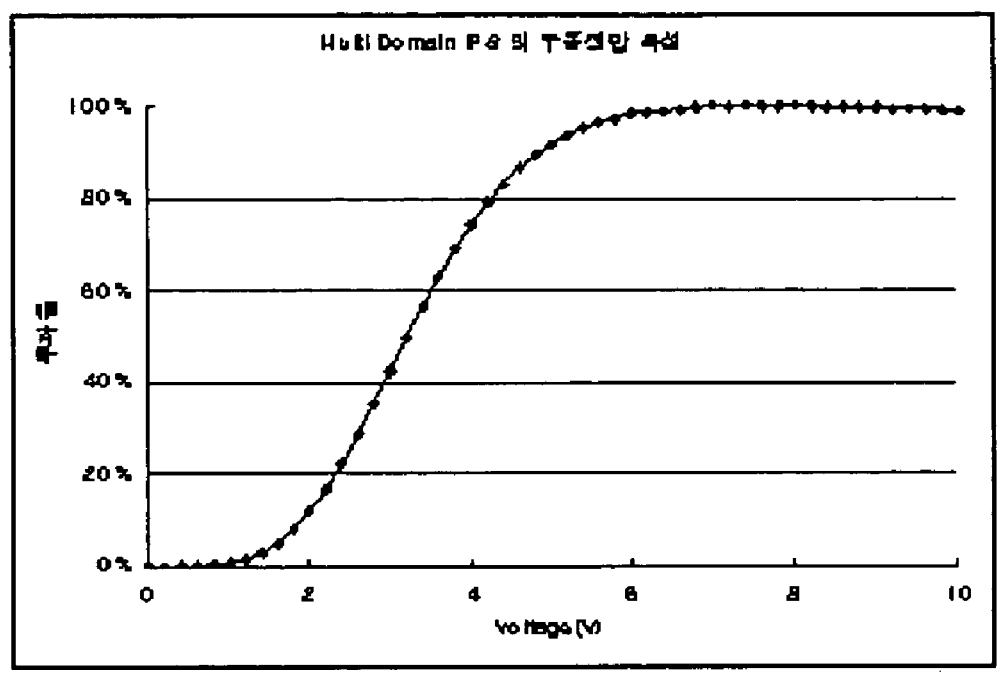
FIG. 10 is a V-T curve showing transmittance property according to voltage of an in-plane switching mode liquid crystal display device according to the first embodiment of the present invention.

FIG. 10 is a V-T curve showing transmittance property according to voltage of an in-plane switching mode liquid crystal display device. As shown in FIG. 10, transmittance curve 360 increases according to a voltage applied to a common electrode and a pixel electrode. When a voltage of about 6V is applied, the transmittance curve has a maximum value of about 100%. In addition, the transmittance curve does not decrease but keeps the maximum value of about 100% even when a voltage higher than about 6V is applied. Accordingly, a voltage higher than a critical value, for example, about 6V, may be used for an IPS mode LCD device so that images of high brightness and high display quality can be displayed through the IPS mode LCD device.

Figure 11:
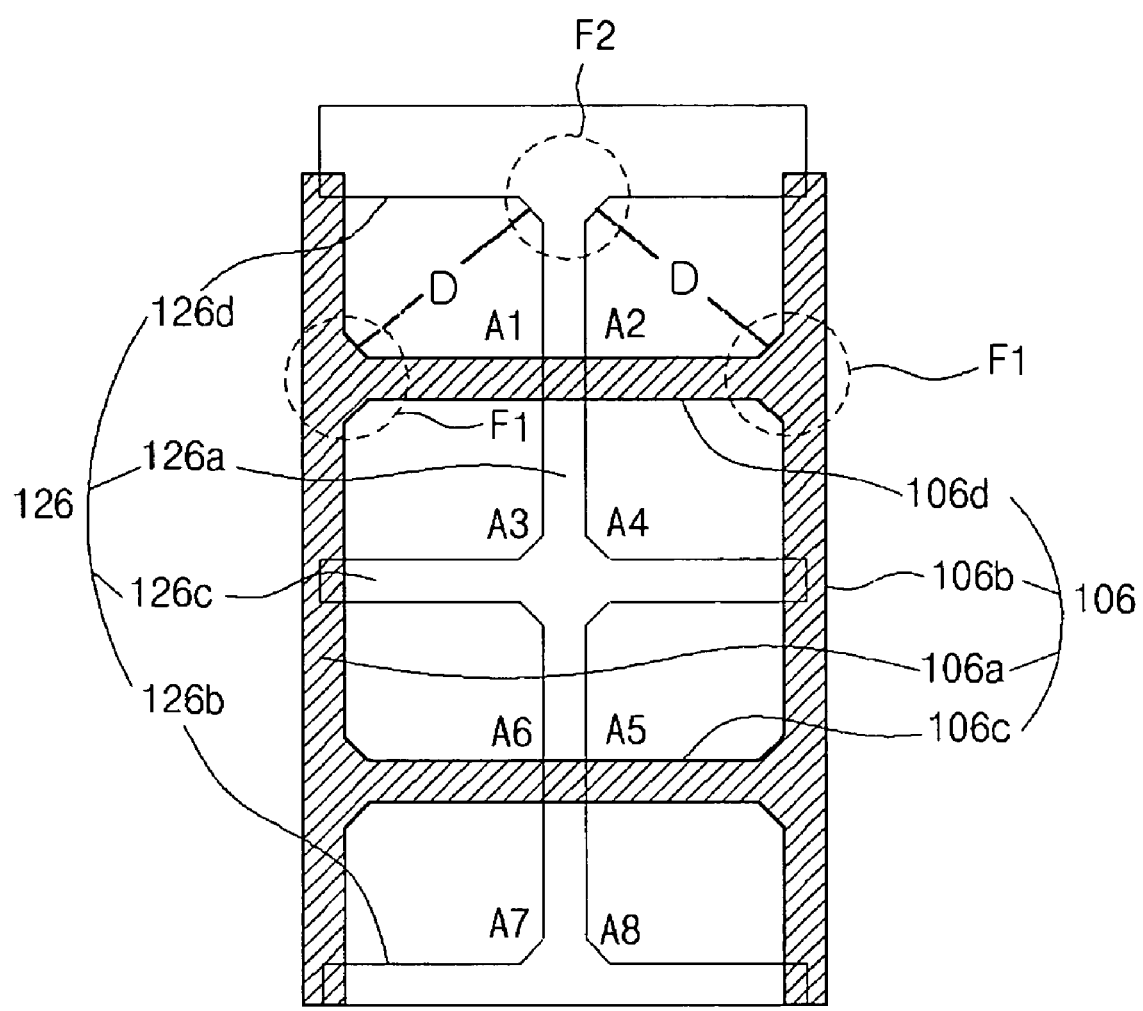
FIG. 11 is a schematic plan view showing a common electrode and a pixel electrode for an in-plane switching mode liquid crystal display device according to a second embodiment of the present invention.
Figure 12:
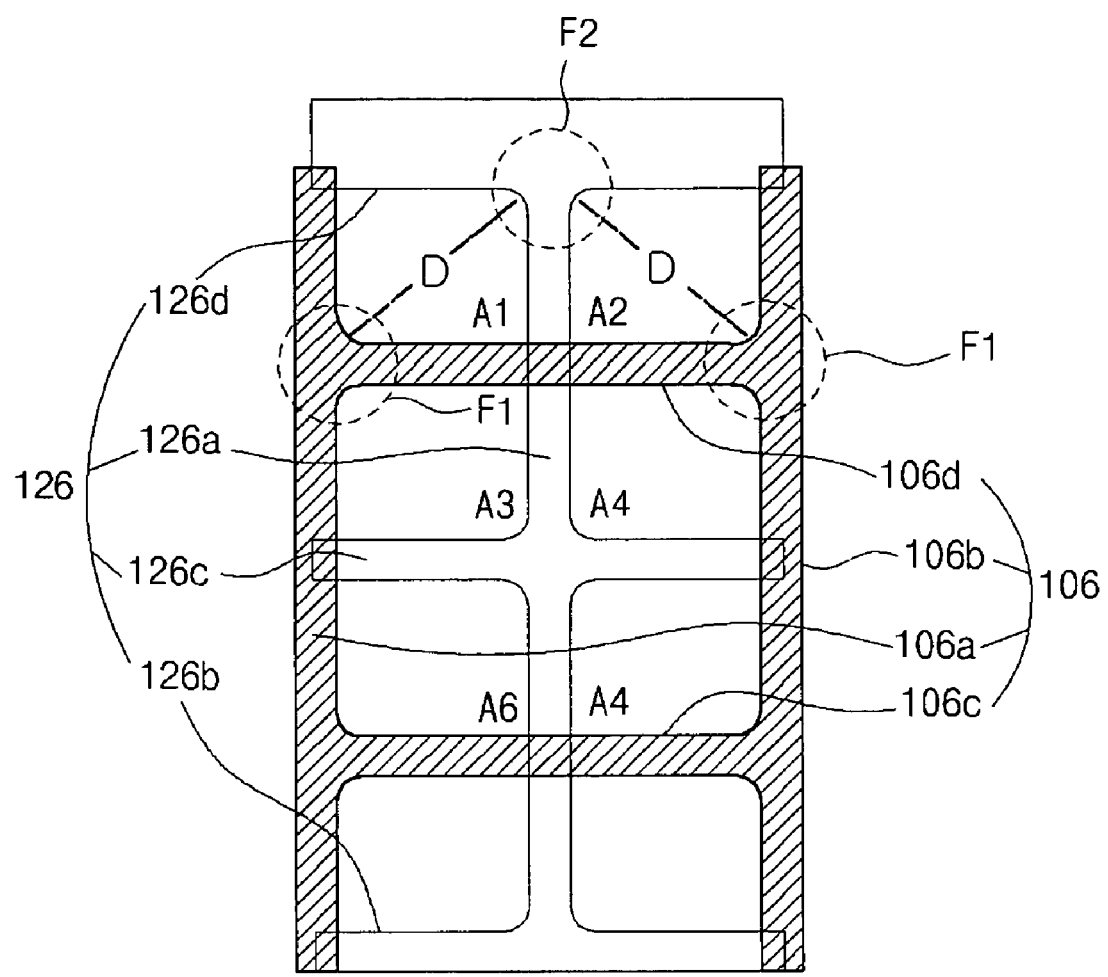
FIG. 12 is a schematic plan view showing a common electrode and a pixel electrode for an in-plane switching mode liquid crystal display device according to a third embodiment of the present invention.

FIG. 11 is a schematic plan view showing a common electrode and a pixel electrode for an in-plane switching mode liquid crystal display device according to a second embodiment of the present invention, and FIG. 12 is a schematic plan view showing a common electrode and a pixel electrode for an in-plane switching mode liquid crystal display device according to a third embodiment of the present invention.

In FIGS. 11 and 12, a common electrode 106 alternates with a pixel electrode 126 along the first and second directions in a pixel region. The common electrode 106 and the pixel electrode 126 having a shape of character "L" symmetrically face each other along a diagonal direction of the pixel region. Accordingly, the pixel region may be divided into a plurality of domains "A1" to "A8" having a rectangular shape.

The common electrode 106 includes a first vertical portion 106a, a second vertical portion 106b, a first horizontal portion 106c and a second horizontal portion 106d. The first and second vertical portions 106a and 106b are disposed at both sides of the pixel region, and the first and second horizontal portions 106c and 106d cross and combine the first and second vertical portions 106a and 106b. The pixel electrode 126 includes a vertical portion 126a, a first horizontal portion 126b, a second horizontal portion 126c and a third horizontal portion 126d. The vertical portion 126a is parallel to and spaced apart from the first and second vertical portions 106a and 106b of the common electrode 106, and the first to third horizontal portions 126b to 126d cross the vertical portion 126a.

The vertical portion 126a of the pixel electrode 126 alternates with the first and second vertical portions 106a and 106b of the common electrode 106. The first to third horizontal portions 126b to 126d of the pixel electrode 126 alternate with the first and second horizontal portions 106c and 106d of the common electrode 106.

In each of the plurality of domains "A1" to "A8" having a rectangular shape, an electric field is induced between the common electrode 106 and the pixel electrode 126 along a diagonal direction of the rectangular shape. Distance between the common electrode 106 and the pixel electrode 126 along the diagonal direction varies according to positions of the common electrode 106 and the pixel electrode 126. The distance has a maximum value between a first edge region "F1" of the common electrode 106 and a second edge region "F2" of the pixel electrode 126 in each domain. The first edge region is a crossing region of the vertical portions 106a and 106d and the horizontal portions 106b and 106c of the common electrode 106. In addition, the second edge region "F2" is a crossing region of the vertical portion 126a and the horizontal portions 126b, 126c and 126d of the pixel electrode 126.

Electric field intensity is inversely proportional to a square of a distance between charges (source of electric field). Thus, as the distance between charges decreases, the electric field intensity increases and liquid crystal molecules respond to the electric field faster. In the second and third embodiments, an auxiliary common electrode is formed at the first edge region "F1," and an auxiliary pixel electrode is formed at the second edge region "F2." The auxiliary common electrode extends from the common electrode 106 and fills the first edge region "F1," and the auxiliary pixel electrode extends from the pixel electrode 126 and fills the second edge region "F2." As a result, the distance "L" between the first and second edge regions "F1" and "F2" is reduced and the electric field intensity increases. Accordingly, a response time of the liquid crystal molecules is reduced and quality of the IPS mode LCD device is improved. An outer side of the auxiliary common electrode and the auxiliary pixel electrode has a straight shape in the second embodiment of FIG. 11, and an outer side of the auxiliary common electrode and the auxiliary pixel electrode has a round shape in the third embodiment of FIG. 12.

Figure 13:
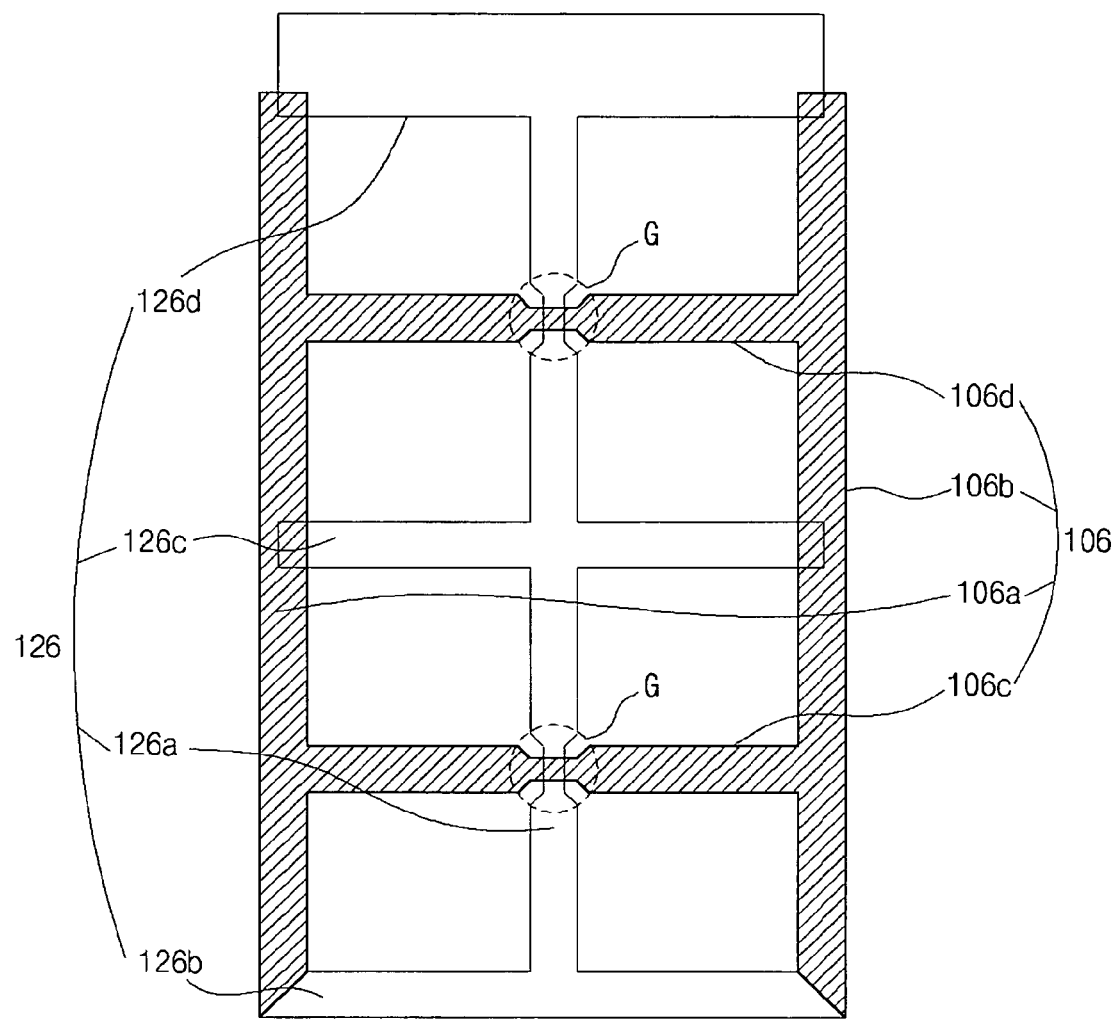
FIG. 13 is a schematic plan view showing a common electrode and a pixel electrode for an in-plane switching mode liquid crystal display device according to a fourth embodiment of the present invention.

FIG. 13 is a schematic plan view showing a common electrode and a pixel electrode for an in-plane switching mode liquid crystal display device according to a fourth embodiment of the present invention.

As shown in FIG. 13, a common electrode 106 overlaps a pixel electrode 126 with an intervening insulating layer at a crossing region "G" Accordingly, the common electrode 106 and the pixel electrode 126 constitute an undesired capacitor and this undesired capacitor may cause reduction of response speed of liquid crystal molecules. To reduce capacitance of the undesired capacitor, the common electrode 106 is formed such that a width of the crossing region "G" is less than that of the other regions. Similarly, the pixel electrode 126 is formed such that a width of the crossing region "G" is less than that of the other regions. Therefore, capacitance of the crossing region "G" is reduced and response speed of liquid crystal molecules is increased so that high display quality can be obtained.

FIGS. 14A to 14E are schematic cross-sectional views taken along line "XIV—XIV" of FIG. 6 showing a fabricating process of an array substrate for an in-plane switching mode liquid crystal display device according to the first embodiment of the present invention, and FIGS. 15A to 15E are schematic cross-sectional views taken along a line "XV—XV" of FIG. 6 showing a fabricating process of an array substrate for an in-plane switching mode liquid crystal display device according to the first embodiment of the present invention.

Figure 14A:
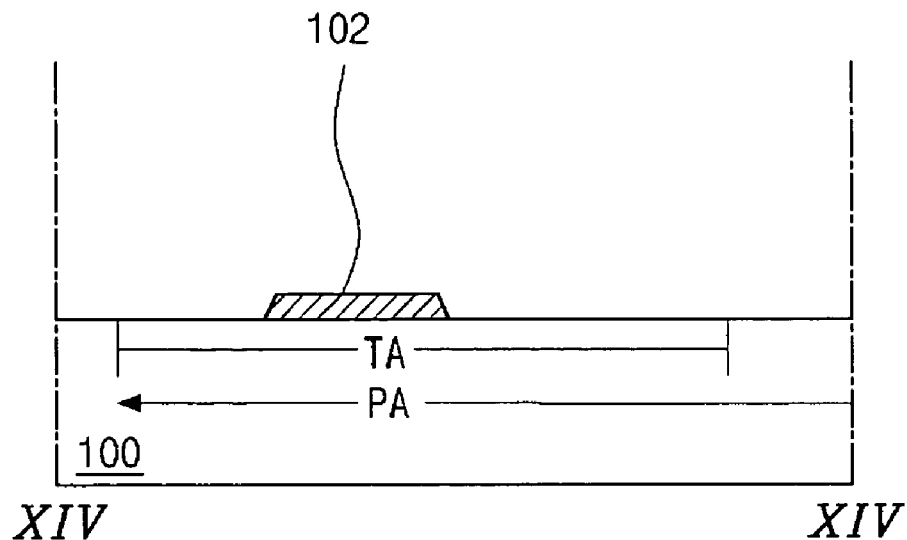
FIGS. 14A to 14E are schematic cross-sectional views taken along a line "XIV—XIV" of FIG. 6 showing a fabricating process of an array substrate for an in-plane switching mode liquid crystal display device according to the first embodiment of the present invention.
Figure 15A:
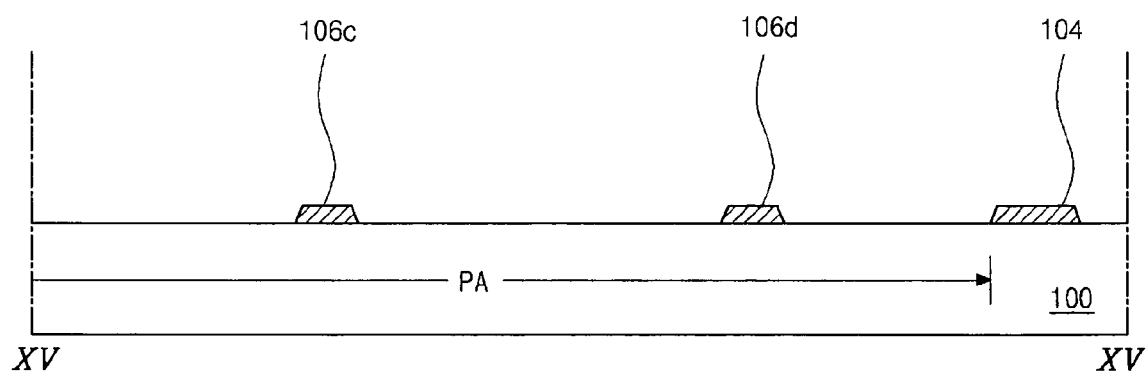
FIGS. 15A to 15E are schematic cross-sectional views, taken along a line "XV—XV" of FIG. 6 showing a fabricating process of an array substrate for an in-plane switching mode liquid crystal display device according to the first embodiment of the present invention.

In FIGS. 14A and 15A, a gate electrode 102 and a gate line 104 are formed on a substrate 100 having a switching region "TA" and a pixel region "PA" by depositing and patterning one of aluminum (Al) and aluminum (Al) alloy. The gate electrode 102 connected to the gate line 104 is disposed in the switching region "TA" and the gate line 104 is disposed at one side of the pixel region "PA." A common electrode including vertical portions and horizontal portions is formed on the substrate 100 in the pixel region "PA."

While FIG. 15A shows only first and second horizontal portions 106c and 106d of the common electrode, first and second vertical portions perpendicular to the gate line 104 are also formed on the substrate 100, at both sides of the pixel region "PA." While not shown in FIG. 15A, the common electrode in the pixel region "PA" is connected to another common electrode in adjacent pixel region.

The gate line may include aluminum (Al) to reduce resistance and prevent signal delay. Since pure aluminum (Al) is susceptible physically and chemically, defects, such as pinholes and hillocks, are apt to occur. Accordingly, a protection layer including an additional metallic material such as chromium (Cr) and molybdenum (Mo).

Figure 14B:
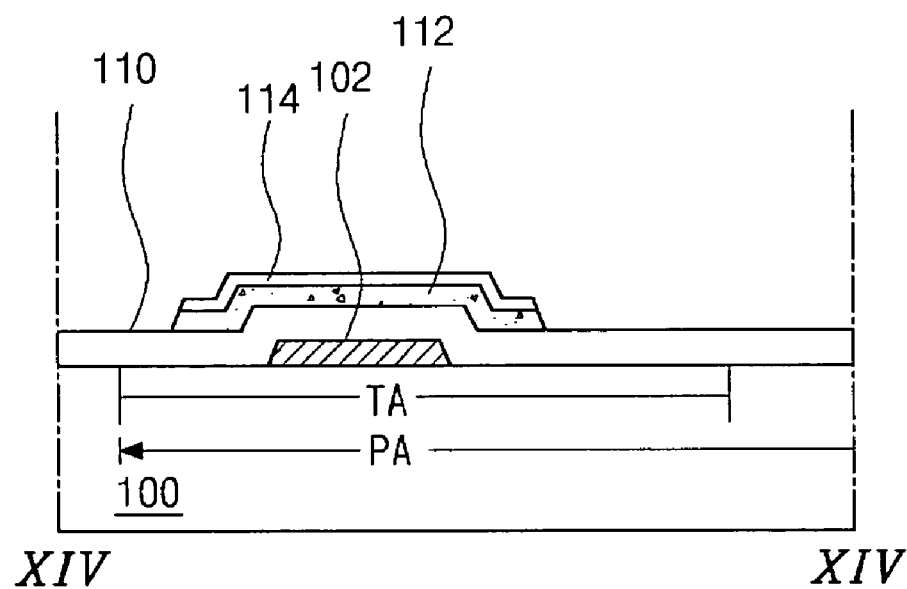
Figure 15B:
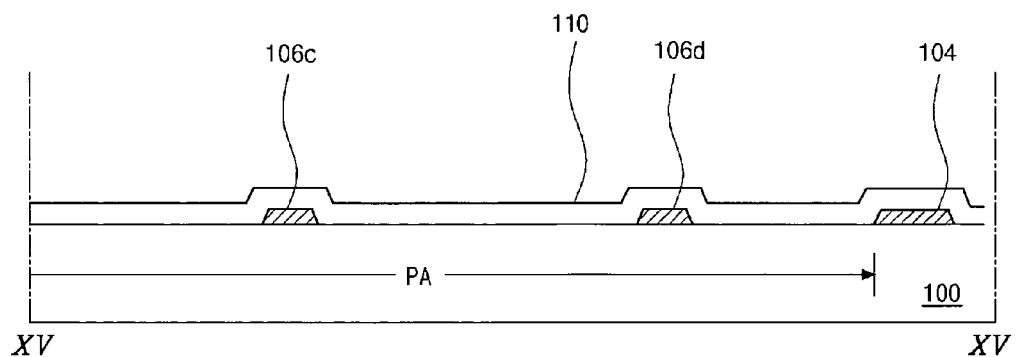

In FIGS. 14B and 15B, a gate insulating layer 110 is formed on an entire surface of the substrate 100 having the gate electrode 102, the gate line 104 and the common electrode 106 (of FIG. 6) by depositing one of an inorganic insulating material such as silicon oxide ($SiO_2$) and silicon nitride (SiNx). An active layer 112 and an ohmic contact layer 114 are sequentially formed on the gate insulating layer 110 over the gate electrode 102 by depositing and patterning amorphous silicon (a-Si:H) and impurity-doped amorphous silicon (n+a-Si:H).

Figure 14C:
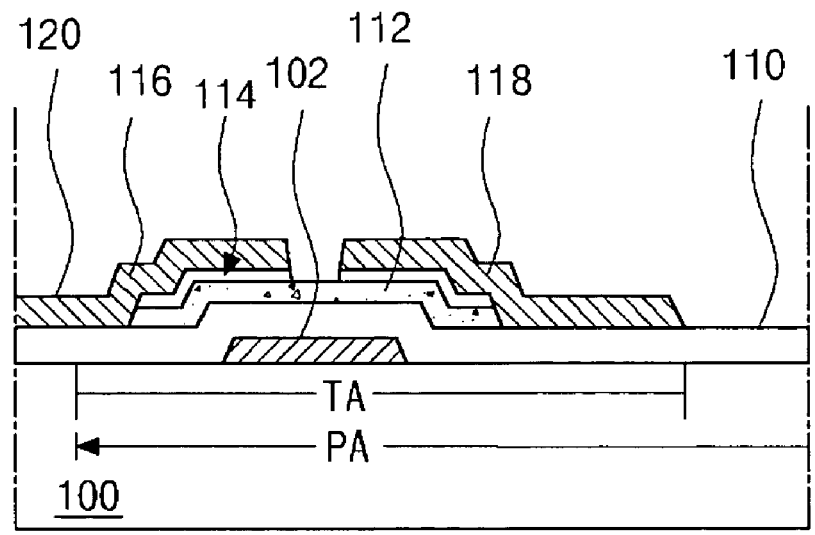
Figure 15C:
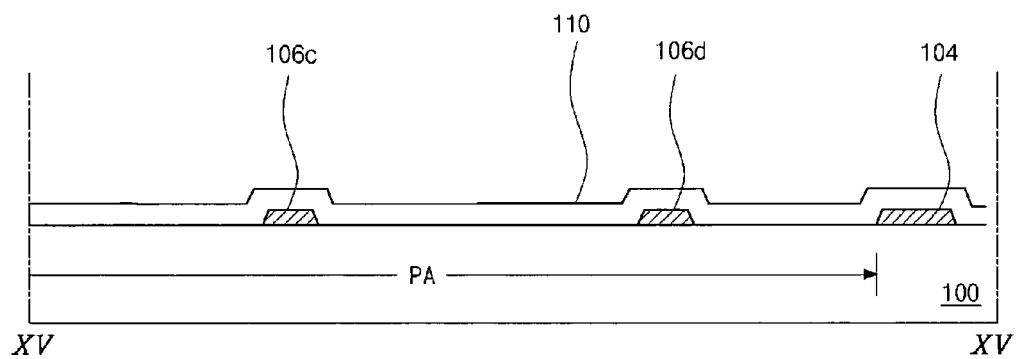

In FIGS. 14C and 15C, a source electrode 116 and a drain electrode 118 are formed on the ohmic contact layer 114 by depositing and patterning one of a conductive metallic material, such as chromium (Cr), molybdenum (Mo), tungsten (W), titanium (Ti) and copper (Cu). The source and drain electrodes 116 and 118 are spaced apart from each other. At the same time, a data line 120 is formed on the gate insulating layer 110. The data line 120 is connected to the source electrode 116 and crosses the gate line 104 to define the pixel region "PA."

Figure 14D:
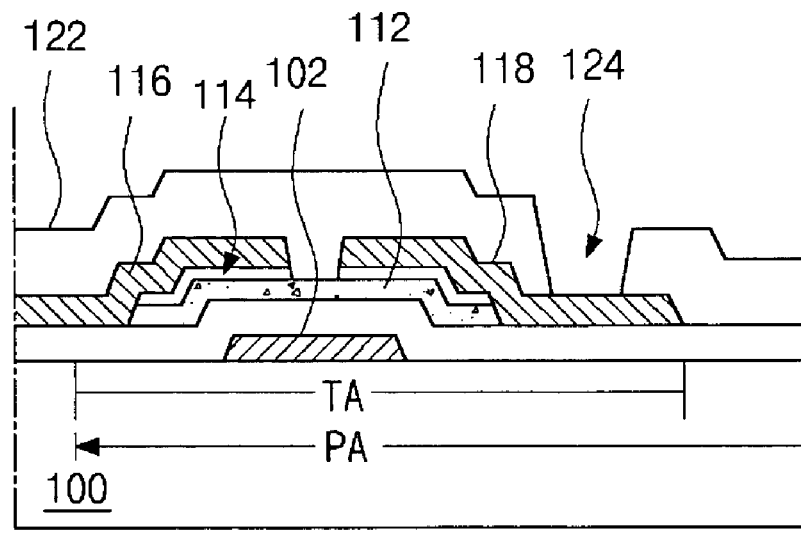
Figure 15D:
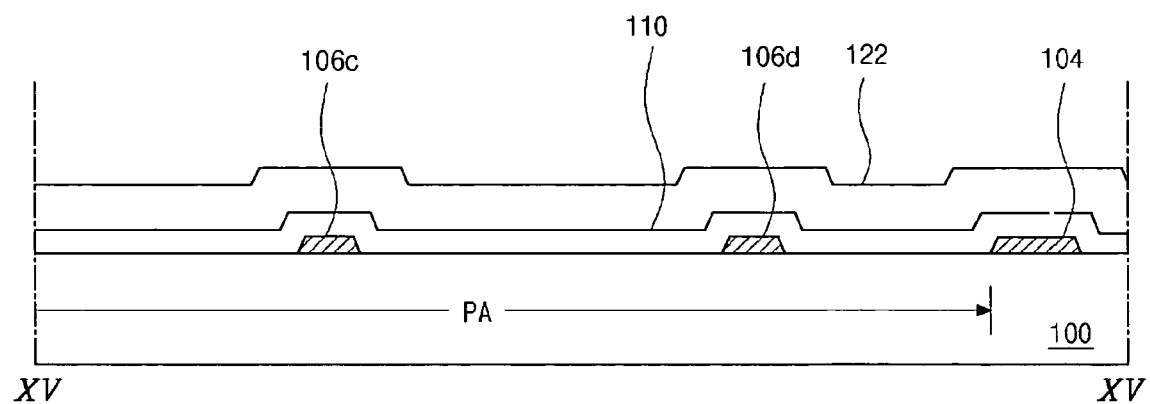

In FIGS. 14D and 15D, a passivation layer 122 is formed on an entire surface of the substrate 100 having the source electrode 116, the drain electrode 118 and the data line 120 by depositing and patterning one of an organic insulating material such as benzocyclobutene (BCB) and acrylic resin having a relatively low dielectric constant. The passivation layer 122 has a drain contact hole 124 exposing the drain electrode 118.

Figure 14E:
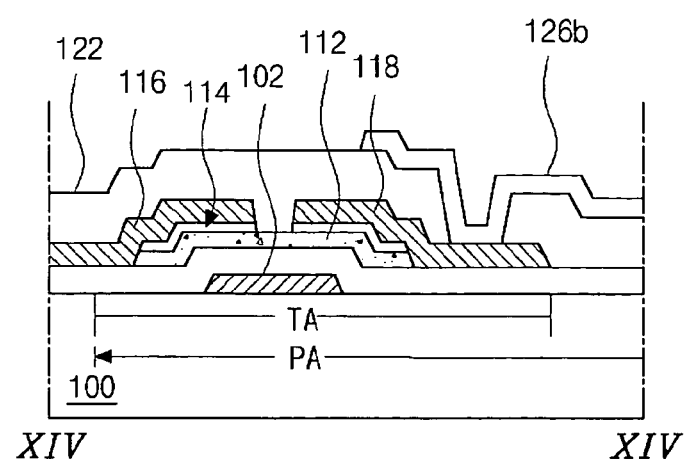
Figure 15E:
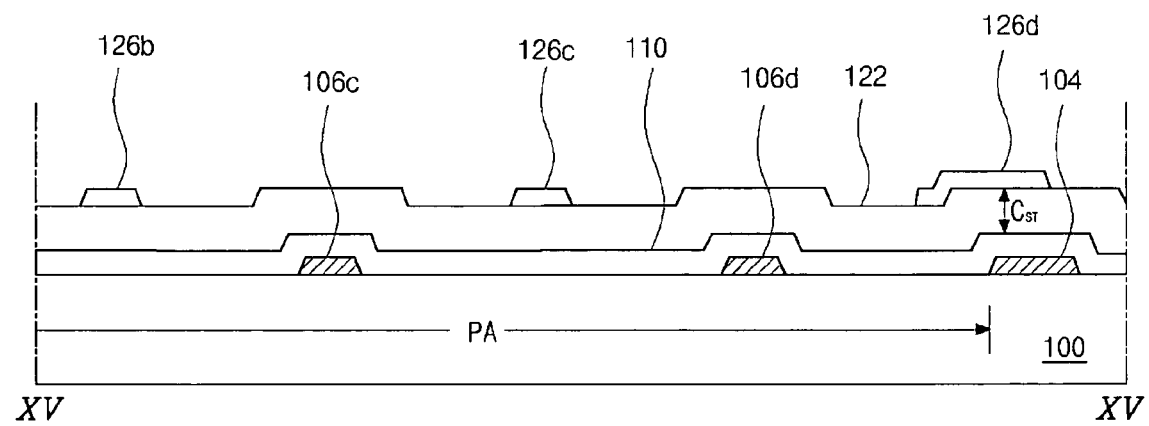

In FIGS. 14E and 15E, a pixel electrode 126 (of FIG. 6) is formed on the passivation layer 122 by depositing and patterning one of a transparent conductive material such as indium-tin-oxide (ITO) and indium-zinc-oxide (IZO). The pixel electrode 126 (of FIG. 6) is connected to the drain electrode 118 through the drain contact hole 124. The pixel electrode 126 (of FIG. 6) may include vertical portions and horizontal portions such as vertical portion 126a (of FIG. 6) and first to third horizontal portions 126b to 126d. The third horizontal portion 126d of the pixel electrode 126 (of FIG. 6) overlaps the gate line 104 to constitute a storage capacitor "$C_{ST}$" with the passivation layer 122 and the gate insulating layer 110.

The common electrode 106 (of FIG. 6) and the pixel electrode 126 (of FIG. 6) divide the pixel region "PA" into a plurality of domains having a rectangular shape. In each of the plurality of domains, the common electrode 106 (of FIG. 6) and the pixel electrode 126 (of FIG. 6) have a shape of character "L" and symmetrically face each other along a diagonal direction of the pixel region "PA." Electric fields generated between the common electrode 106 (of FIG. 6) and the pixel electrode 126 (of FIG. 6) in each domain may have symmetric directions having angles of about 135° and about 45° with respect to the horizontal portions 106c, 106d, 126b, 126c and 126d of the common electrode 106 (of FIG. 6) and the pixel electrode 126 (of FIG. 6). Accordingly, the plurality of domains having symmetric alignment directions are formed in one pixel region "PA" due to the symmetric electric fields and deterioration such as color shift is prevented due to an optical compensation. Moreover, since the electric fields have angles of about 135° and about 45° even when a high voltage is applied, a stable transmittance property is obtained. Therefore, display quality and viewing angle of an IPS mode LCD device are improved.

An IPS mode LCD device according to embodiments of the present invention has several advantages. First, since a common electrode and a pixel electrode having a shape of character "L" are symmetrically disposed along a diagonal direction to face each other, liquid crystal molecules are re-arranged along a direction having an angle of about 135° and about 45° with respect to a horizontal portion of the common electrode and the pixel electrode even when a relatively high voltage is applied. Thus, high brightness is obtained. Second, since a relatively high voltage is used to drive the liquid crystal molecules, a distance between a common electrode and a pixel electrode increases so that aperture ratio can be improved. Third, a response speed is improved due to increased electric field intensity resulting from an auxiliary common electrode and an auxiliary pixel electrode at edge regions. Fourth, a response speed is improved due to reduction of undesired capacitance resulting from reduction of width of a common electrode and a pixel electrode at a crossing region. Fifth, since one pixel region includes a plurality of symmetric domains, color shift is prevented due to optical compensation and stable wide viewing angle is obtained.

It will be apparent to those skilled in the art that various modifications and variations can be made in the liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
    a substrate;
    a thin film transistor on the substrate;
    a gate line connected to the transistor;
    a data line crossing the gate line and connected to the transistor, the crossed data line and gate line defining boundaries of a pixel region;
    a pixel electrode disposed in the pixel region connected to the transistor, the pixel electrode including at least one vertical portion and a plurality of horizontal portions; and
    a common electrode disposed in the pixel region, the common electrode including at least two vertical portions and a plurality of horizontal portions,
    wherein the vertical portion of the pixel electrode is disposed between the vertical portions of the common electrode, and
    wherein the horizontal portions of the common electrode cross the vertical portion of the pixel electrode at a crossing region with a width of at least one of the horizontal portions of the common electrode at the crossing region being less than the width of the at least one of the horizontal portions of the common electrode at other regions, and a width of the vertical portion of the pixel electrode at the crossing region being less than the width of the vertical portion of the pixel electrode at other regions.

2. The array substrate according to claim 1, wherein the common electrode and the pixel electrode symmetrically face each other along a diagonal direction of the pixel region.

3. The array substrate according to claim 1, wherein the common electrode and the pixel electrode define a plurality of domains having a rectangular shape in the pixel region.

4. The array substrate according to claim 1, wherein the thin film transistor includes a gate electrode connected to the gate line, a source electrode connected to the data line, and a drain electrode spaced apart from the source electrode and connected to the pixel electrode.

5. The array substrate according to claim 1, wherein the common electrode includes first and second vertical portions disposed at opposing sides of the pixel region, and the plurality of horizontal portions of the common electrode connect the first and second common vertical portions.

6. The array substrate according to claim 5, wherein the vertical portion of the pixel electrode is disposed between the first and second vertical portions of the common electrode, and the plurality of horizontal portions of the pixel electrode cross the vertical portion of the pixel electrode and are spaced apart from the plurality of horizontal portions of the common electrode.

7. The array substrate according to claim 6, wherein one of the plurality of horizontal portions of the pixel electrode overlaps the gate line to define a storage capacitor.

8. The array substrate according to claim 6, further comprising an auxiliary common electrode portion at a crossing region of one of the first and second vertical portions of the common electrode and one of the plurality of horizontal portions of the common electrode.

9. The array substrate according to claim 8, wherein an outer side of the auxiliary common electrode portion has one of a straight shape and a round shape.

10. The array substrate according to claim 6, further comprising an auxiliary pixel electrode portion at a crossing region of the vertical portion of the pixel electrode and one of the plurality of horizontal portions of the pixel electrode.

11. The array substrate according to claim 10, wherein an outer side of the auxiliary pixel electrode portion has one of a straight shape and a round shape.

12. A method of fabricating an array substrate for an in-plane switching mode liquid crystal display device, comprising:
   forming a gate line on a substrate;
   forming a data line crossing the gate line, the crossed data line and gate line defining boundaries of a pixel region;
   forming a thin film transistor;
   forming a pixel electrode in the pixel region to include at least one vertical portion and a plurality of horizontal portions; and
   forming a common electrode in the pixel region to include at least two vertical portions and a plurality of horizontal portions,
   wherein the pixel electrode, data line, and gate electrode are connected to the thin film transistor, wherein the vertical portion of the pixel electrode is disposed between the vertical portions of the common electrode, and wherein the horizontal portions of the common electrode cross the vertical portion of the pixel electrode, and wherein the horizontal portions of the common electrode cross the vertical portion of the pixel electrode at a crossing region with a width of at least one of the horizontal portions of the common electrode at the crossing region being less than the width of the at least one of the horizontal portions of the common electrode at other regions, and a width of the vertical portion of the pixel electrode at the crossing region being less than the width of the vertical portion of the pixel electrode at other regions.

13. The method according to claim 12, wherein the gate line is formed of the same layer and the same material as the common electrode.

14. The method according to claim 12, wherein the plurality of horizontal portions of the common electrode are connected between the vertical portions of the common electrode.

15. The method according to claim 14, wherein the plurality of horizontal portions of the pixel electrode crossing the vertical portion of the pixel electrode and are spaced apart from the plurality of horizontal portions of the common electrode.

16. The method according to claim 15, further comprising forming an auxiliary common electrode portion at a crossing region of one of the first and second vertical portions of the common electrode and one of the plurality of horizontal portions of the common electrode.

17. The method according to claim 16, wherein an outer side of the auxiliary common electrode portion has one of a straight shape and a round shape.

18. The method according to claim 15, further comprising forming an auxiliary pixel electrode portion at a crossing region of the vertical portion of the pixel electrode and one of the plurality of horizontal portions of the pixel electrode.

19. The method according to claim 18, wherein an outer side of the auxiliary pixel electrode portion has one of a straight shape and a round shape.

* * * * *